July 30, 1968    E. J. KJELLSTROM    3,394,605
MULTI-BELT PULLEY

Filed Jan. 4, 1968    4 Sheets-Sheet 1

INVENTOR.
ELVING J. KJELLSTROM
BY *Joseph G. Werner*

ATTORNEY

July 30, 1968  E. J. KJELLSTROM  3,394,605
MULTI-BELT PULLEY

Filed Jan. 4, 1968  4 Sheets-Sheet 4

INVENTOR.
ELVING J. KJELLSTROM
BY Joseph L. Werner

ATTORNEY

United States Patent Office 3,394,605
Patented July 30, 1968

3,394,605
MULTI-BELT PULLEY
Elving J. Kjellstrom, 458 Oak St.,
Oregon, Wis. 53575
Continuation-in-part of application Ser. No. 580,431,
Sept. 19, 1966. This application Jan. 4, 1968, Ser.
No. 695,783
4 Claims. (Cl. 74—230.5)

ABSTRACT OF THE DISCLOSURE

A fin-type pulley for gripping a plurality of flexible drive belts in an undulating manner to maintain faithful response. The pulley has a frusto-conical web having radially spaced curved belt engaging segments formed therein and curved fins associated therewith to form grooves for gripping the belts. The belt engaging surface of each of the fins and sections has the configuration of a section of a wall of a cone which has its axis at an angle to the axis of rotation of the pulley.

This application is a continuation-in-part of my earlier application, Ser. No. 580,431, filed Sept. 19, 1966, now abandoned.

Background of the invention (1) Field of the invention.—This invention relates to pulleys and more particularly to a finned pulley for gripping a plurality of drive belts in an undulating manner.

(2) Description of the prior art.—Conventional multi-belt pulleys generally comprise a number of different size pairs of formed webs. Each pair of formed webs is spot welded together to provide a continuous peripheral V-shaped groove for receiving a conventional drive belt. A number of different size pairs of webs are then mounted on a single hub or otherwise fixedly attached together to form a pulley for a plurality of belts. This form of multi-pulley is really just a number of conventional single-belt pulleys rigidly fixed together. Another conventional form of multi-belt pulley is one turned out of a solid hub.

While these known types of multi-belt pulleys have for a long time been and are presently extensively used throughout the world, they have several shortcomings. They do not always maintain faithful response with the belts, particularly after the belts have been in use for a period of time and have become somewhat worn or stretched. The continuous grooves and belts pick up dirt, grease, and the like over a period of time which speeds the deterioration of the rubber composition of the belts. Furthermore, these conventional multi-belt pulleys are relatively heavy because the double web structure for forming each continuous groove requires the use of a considerable amount of metal and the pulleys are expensive because the labor involved in welding the pieces together is very costly. The solid type multi-belt pulleys are also quite heavy and costly because of the large amount of material and labor involved.

Various attempts have been made to design finned, single-belt pulleys which eliminates slippage between the pulley and the belt to prolong the life of the belt. These attempts have been generally unsuccessful for single-belt pulleys and to my knowledge have not been widely practiced with multi-belt pulleys.

Summary of the invention

In brief, my invention comprises new and improved multi-belt pulleys which have a rigid web having at least one frusto-conical portion and a plurality of radially spaced series of fins wherein the belt engaging surfaces of the fins of any one series and the belt engaging surfaces of fin-like web segments associated therewith have the configuration of a section of the wall of a cone having its axis forming an angle with the axis of rotation of the pulley. The vertex angle of said cone is less than the vertex angle of a second cone which would be formed by swinging a radial median line drawn on the belt engaging surface of the fin or web segment, as the case may be, in a circle about the axis of rotation of the pulley.

My improved light-weight pulleys have a frusto-conical web and integral groove forming elements which may be stamped from a unitary sheet of metal for very low-cost production for gripping a plurality of drive belts in an undulating manner to maintain faithful pulley-belt response and minimize belt wear.

Further objects, features and advantages of my invention will be apparent from the following detailed description taken in conjunction with the accompanying drawings showing several preferred embodiments exemplifying the principles of my invention.

Description of the preferred embodiments

Figure 1:
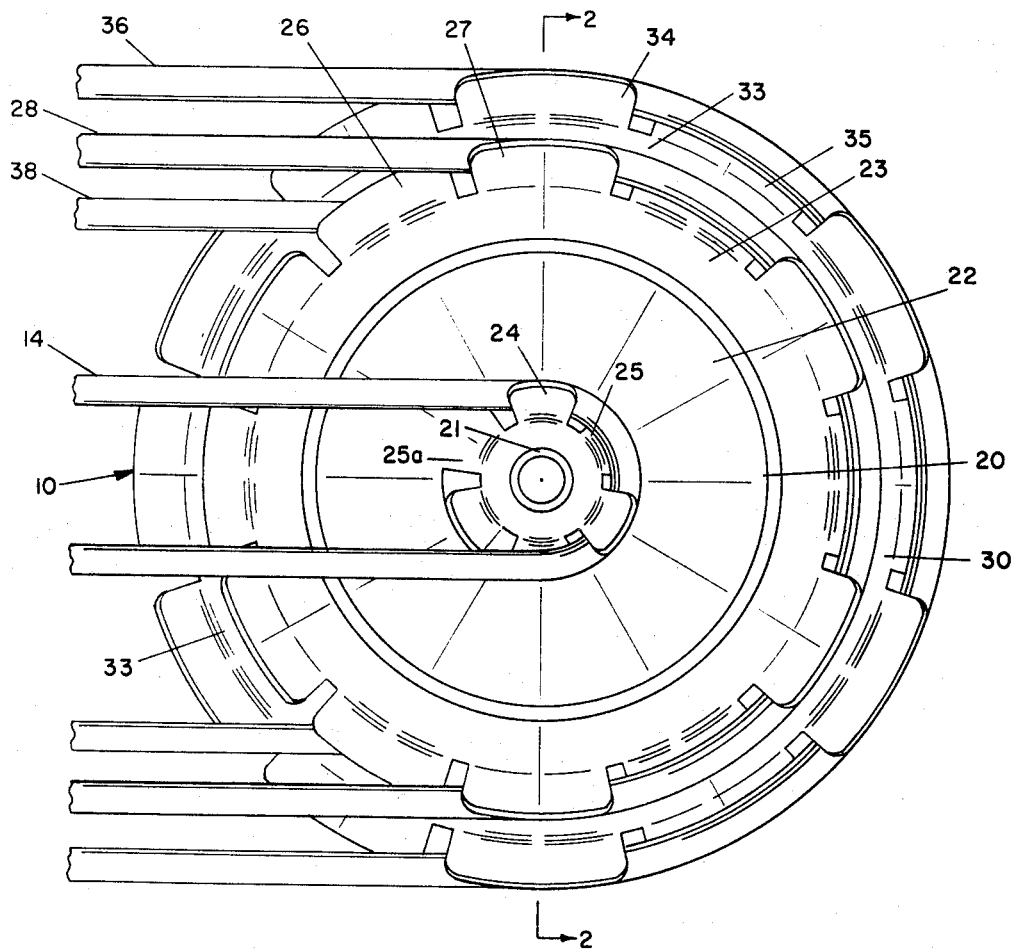
FIG. 1 is a side view of a multi-belt pulley embodying my invention.
Figure 2:
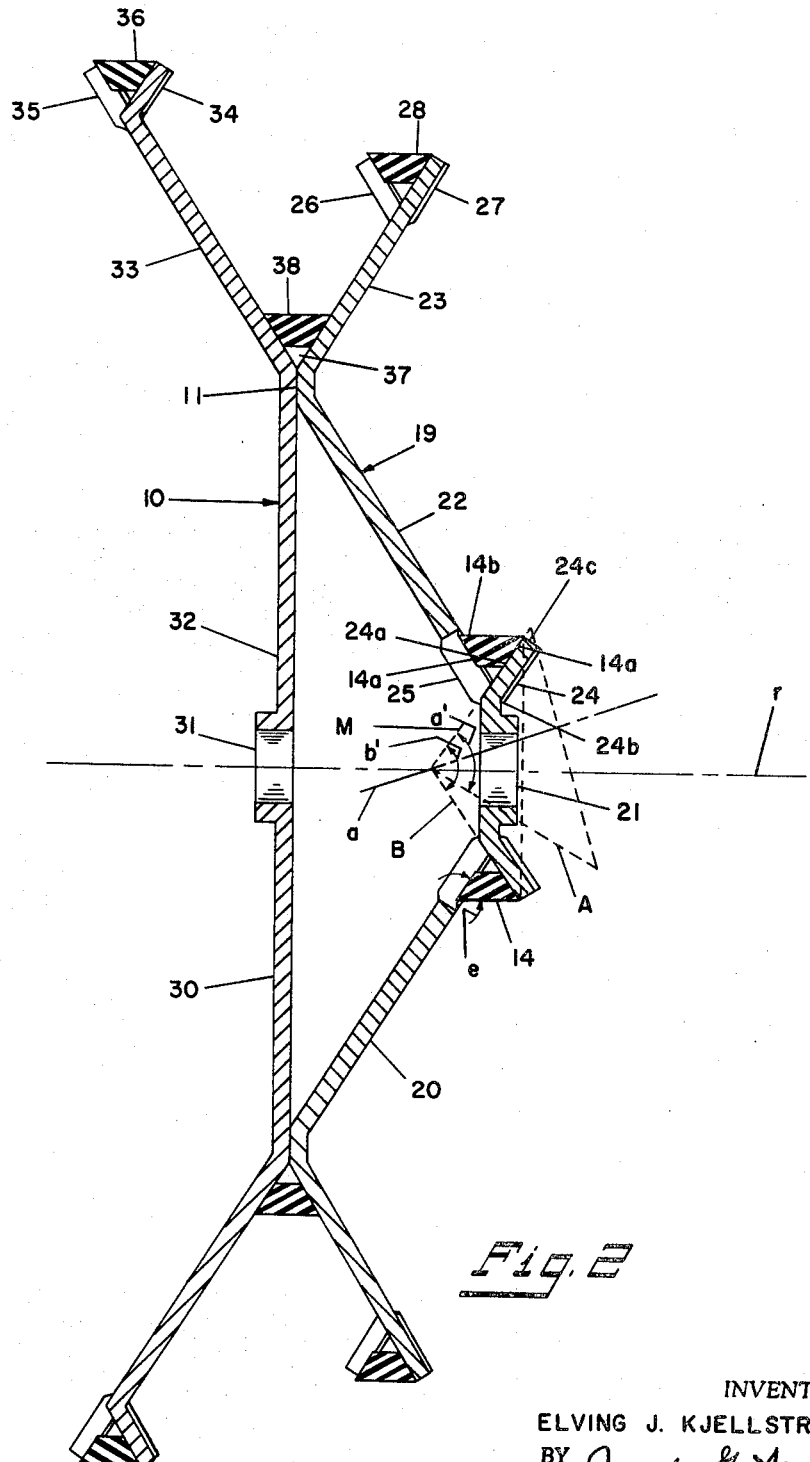
FIG. 2 is a somewhat enlarged schematic cross-sectional view taken along line 2—2 of FIG. 1.

Referring now more particularly to the drawings wherein like numerals refer to like parts throughout the several views, one form of my new and improved multi-belt pulleys is generally designated at 10 in FIGS. 1 and 2. Pulley 10 comprises a frusto-conical web 19 having first web plate 20 and a second web plate 30 which are spot welded together at 11. The web plates have hub portions 21 and 31, respectively, for receiving a shaft. The hubs 21 and 31 may be secured to the shaft by any suitable means such as welding or the like.

Web plate 20 has opposed frusto-conical portions 22 and 23. The inner portion 22 has a series of fins 24, which are circumferentially spaced, as best seen in FIG. 2. The belt engaging surfaces of the fins have the curved configuration of a section of the wall of a cone. For example, as illustrated in regard to fin 24 in FIG. 2, the belt engaging surface 24a thereof has the configuration of a section of a first cone A (shown in dashed lines) having its axis $a$ forming an angle with the axis of rotation $r$ of the pulley. The vertex angle $a'$ of cone A is less than the vertex angle $b'$ of a second cone B which would be formed by swinging a median line (such as shown at M in FIGS. 2 and 3) drawn on the belt engaging surface of the fin in a circle about the axis of rotation $r$ of the pulley. Thus, the belt engaging surface 24a of each of fins 24 has a sharper degree of curvature than cone B formed by rotation of the median line on said surface. Having the configuration of a section of the wall of a cone, the belt engaging surfaces 24a of the fins 24, of course, have a sharper degree of curvature at their bases 24b than at their peripheral edges 24c.

As best seen in FIG. 1, the frusto-conical web portion 20 has circumferentially spaced web segments 25 alternately arranged with respect to fins 24. The curvature of the belt engaging surface 25a of each of web segments 25 is identical to that of fins 24 with which the segments are associated to form a belt receiving groove.

When designed for use with a V-belt such as 14, that is, a belt having a conventional trapezoidal cross-section, such as shown in the drawings, the fins should be bent outward so that the vertex angle $b'$ of the cone B is twice the acute angle $e$ which either of the sides 14a of the belt forms with the base 14b of the belt so that the belt engaging surfaces of the fins conform very closely to the shape of the sides 14a of the belt. When designed for use with belts of circular cross-section, this angle $b'$ is less critical.

Figure 3:
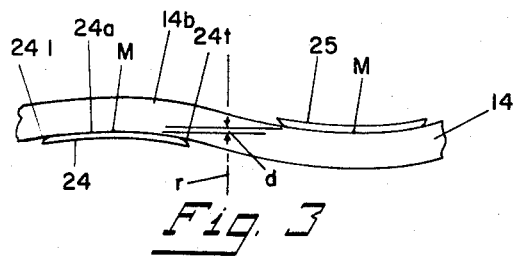
FIG. 3 is a schematic edge view of my invention showing how the groove forming elements of the pulley cause the belts to undulate through the pulley.

FIG. 3 shows how the belt undulates between adjacent fins 24 and web segments 25 and how the fins and segments engage and support the belt along substantially their entire surfaces 24a and 25a, except for the leading and trailing edges of the fins which are coined or radiused as shown at 24l and 24t of fin 24 to prevent wearing of the belt. The distance $d$ between the median lines M drawn on the belt engaging surfaces of adjacent fins and segments, such as 24 and 25 in FIG. 3, measured at the base 14b of the belt 14 parallel to the axis of rotation of the pulley, is less than the width of the base of the belt to provide for gripping of the belt in an undulating manner. The curvature imparted to the belt is somewhat exaggerated in FIG. 3 for exemplification. The particular curvature of the inner surfaces of the fins of my invention, complementing the gradual smooth curvature of the sides of the belt, eliminates contact pressure points and, thus, minimizes wear on the belt and greatly prolongs the life thereof.

Frusto-conical web portion 23 has a second series of fins 26 thereon which are radially spaced from fins 24. Fins 26 are circumferentially spaced, as best seen in FIG. 1, and extend divergently from frusto-conical web portion 23, as best seen in FIG. 2. Frusto-conical web portion 23 also has circumferentially spaced segments 27 alternately arranged with respect to fins 26 to form a groove for receiving a drive belt such as 28. The belt engaging surfaces of fins 26 and the belt engaging surfaces of web segments 27 are substantially identical to each other. Their curved relation is similar to that discussed in regard to fins 24 and web segments 25 hereinbefore.

The second web 30 has a first substantially flat portion 32 and an outer frusto-conical web portion 33. Like frusto-conical portion 23, portion 33 also has a series of fins 34 thereon. The fins 34 are radially spaced further from the axis of rotation $r$ of the pulley than fins 26. Fins 34 are circumferentially spaced, as best seen in FIG. 1, and extent divergently from the frusto-conical web portion 33, as best seen in FIG. 2. Frusto-conical web portion 33 has circumferentially spaced segments 35 alternately arranged with respect to fins 34 to form a groove for receiving a drive belt such as 36. The belt engaging surfaces of fins 34 and the belt engaging surfaces of web segments 35 are substantially identical to each other. The curved relation is similar to that discussed in regard to fins 24 and web segments 25 hereinbefore.

The junction of frusto-conical web portions 23 and 33 provides a conventional continuous groove 37 for an additional belt 38.

While pulley 10 is shown carrying four belts, it is understood that more or less grooves could be provided if desired. For example, another series of groove forming fins and segments could be provided on frusto-conical web portion 33 approximately midway between belts 36 and 38 for carrying an additional belt.

Figure 4:
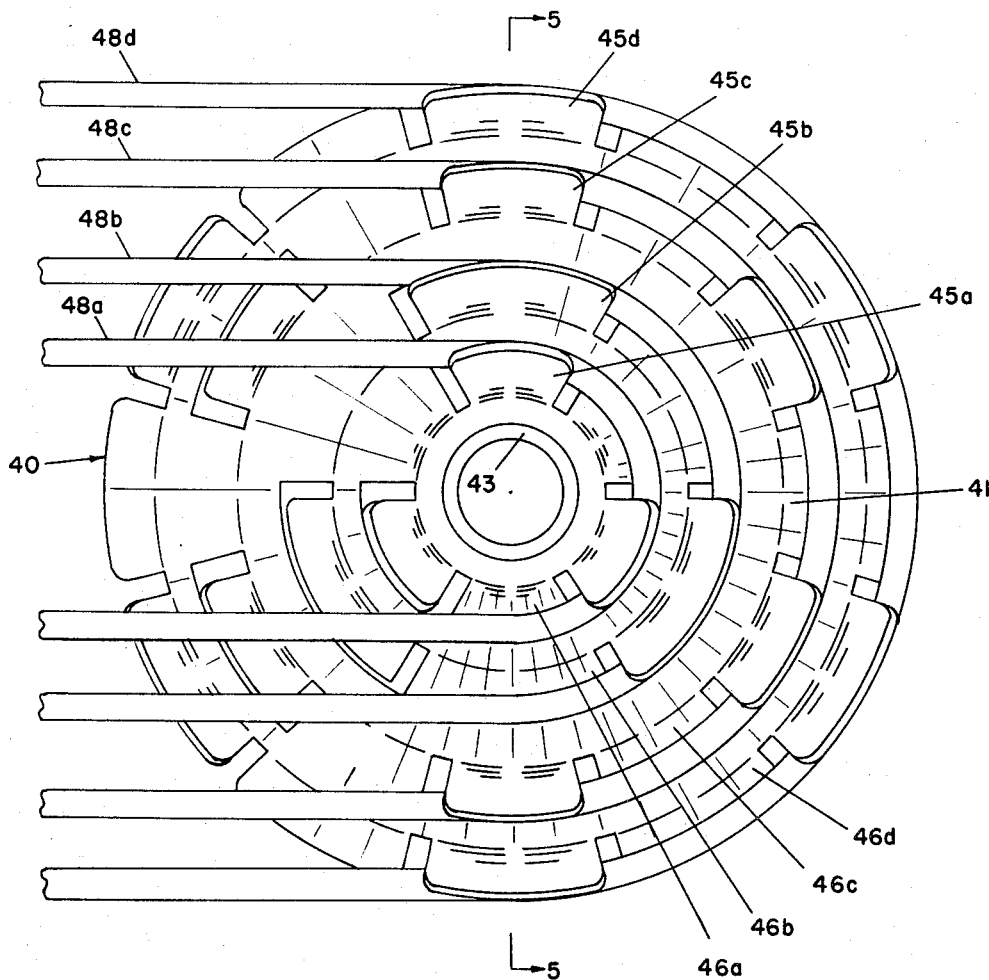
FIG. 4 is a side view of a second embodiment of my invention.
Figure 5:
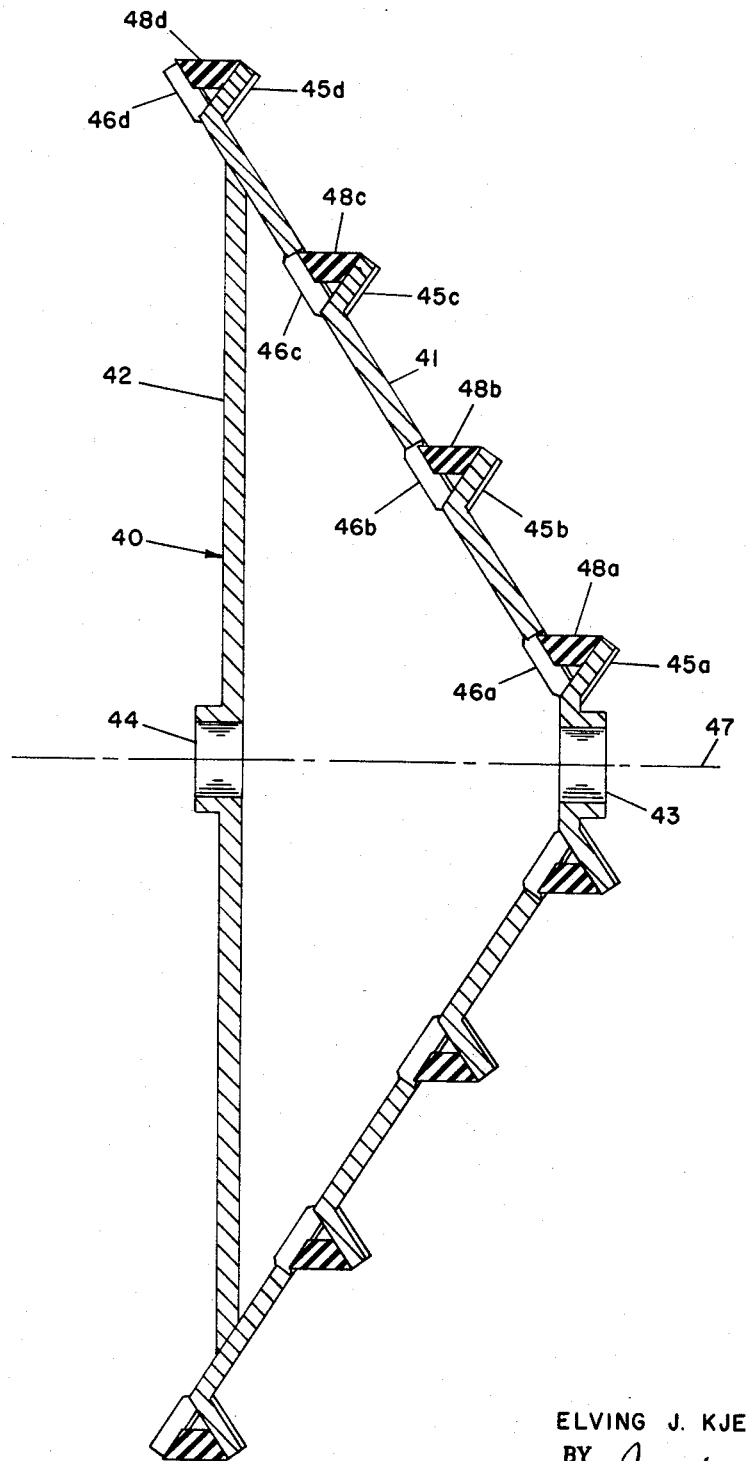
FIG. 5 is a somewhat enlarged schematic cross-sectional view taken along line 5—5 of FIG. 4.

FIGS. 4 and 5 show a second pulley 40 embodying my invention. In the pulley 40 which is shown for exemplification, the frusto-conical web 41 and the flat web plate 42 have hubs 43 and 44, respectively, for attachment to a shaft. The flat web 42 is fixedly attached to the back of web 41 by any suitable means such as welding, or the like.

Frusto-conical web 41 has four radially spaced series of fins, 45a, 45b, 45c and 45d. The fins of any one series are circumferentially spaced, as best seen in FIG. 4, and extend divergently from frusto-conical web portion 41, as best seen in FIG. 5. Frusto-conical web portion 41 also has four corresponding series of segments 46a, 46b, 46c and 46d alternately arranged with respect to fins 45a–45d. The fins and web segments of pulley 40 are shaped in the same manner as the fins and web segments of pulley 10.

While four radially spaced series of fins and segments are shown on pulley 40 for exemplification, it is understood that more or less could be provided for carrying any number of belts desired.

It is further understood that the number of groove forming fins and segments in any one series can also be varied from the number shown in the drawings, if desired.

In addition to the improved belt gripping action which prolongs belt life, a very important advantage of my new multibelt pulleys is that they can be produced at a substantially lower cost than known pulleys because of savings in both material and labor. The webs and integral groove forming fins and segments can be readily stamped out of sheet metal and the webs welded together. The webs may be die cast or molded from plastic.

It is understood that my invention is not confined to the particular construction and arrangement of parts herein illustrated and described, but embraces all such modified forms thereof as may come within the scope of the following claims.

I claim:
1. A pulley for a plurality of flexible drive belts, said pulley comprising:
 (a) a hub for receiving a shaft along the axis of rotation of the pulley,
 (b) a rigid frusto-conical web attached to said hub,
 (c) at least two radially spaced series of fins extending divergently from the frusto-conical web of said pulley, the fins in each series being circumferentially spaced with respect to the other fins in the series,
 (d) at least two series of circumferentially spaced fin-like segments formed in said web and being alternately arranged with respect to said fins, said fins and segments forming grooves therebetween for receiving the belts, and
 (e) each of said fins in any one series and said fin-like segments in groove forming relation therewith having a belt engaging surface having substantially the configuration of a section of the wall of a first cone having its axis forming an angle with the axis of rotation of the pulley, said first cone having a vertex angle which is less than the vertex angle of a second cone formed by swinging a median line drawn on said belt engaging surface in a circle about the axis of rotation of the pulley.

2. The pulley as specified in claim 1 wherein said rigid web has opposed first and second frusto-conical portions, said first and second portions each having at least one of said series of fins and said sections thereon, and including a rigid web plate fixedly attached to said web and having a third frusto-conical portion forming a groove with said second portion for receiving a drive belt.

3. The pulley as specified in claim 2 wherein said third frusto-conical portion has at least one series of fins and segments thereon.

4. A pulley for a plurality of V-belts having a base and a pair of sides each forming an acute angle with the base, said pulley comprising:
 (a) a hub for receiving a shaft along the axis of rotation of the pulley,
 (b) a rigid frusto-conical web attached to said hub,
 (c) at least two radially spaced series of fins extending divergently from the frusto-conical web of said pulley, the fins in each series being circumferentially spaced with respect to the other fins in the series,
 (d) at least two series of circumferentially spaced fin-like segments formed in said web and being alternately arranged with respect to said fins, said fins and segments forming grooves therebetween for receiving the belts, and (e) each of said fins in any one series and said fin-like segments in groove forming relation therewith having a belt engaging surface having substantially the configuration of a section of the wall of a first cone having its axis forming an angle with the axis of rotation of the pulley, said first cone having a vertex angle which is less than the vertex angle of a second cone formed by swinging a median line drawn on said belt engaging surface in a circle about the axis of rotation of the pulley, the vertex angle of said second cone being twice the acute angle which one of the sides of the belt forms with the base of the belt.

References Cited

UNITED STATES PATENTS

| 1,668,778 | 5/1928 | Menningen | 74—230.5 XR |
| 2,738,681 | 3/1956 | Schultz | 74—230.3 |
| 2,846,893 | 8/1958 | Bagley | 74—230.8 |

FOREIGN PATENTS

| 79,396 | 8/1950 | Czechoslovakia. |
| 181,065 | 2/1907 | Germany. |
| 765,433 | 1/1957 | Great Britain. |

FRED C. MATTERN, JR., *Primary Examiner.*

J. A. WONG, *Assistant Examiner.*